United States Patent
Williamson et al.

(10) Patent No.: US 8,051,275 B2
(45) Date of Patent: Nov. 1, 2011

(54) RESULT PATH SHARING BETWEEN A PLURALITY OF EXECUTION UNITS WITHIN A PROCESSOR

(75) Inventors: David James Williamson, Austin, TX (US); Conrado Blasco Allué, Austin, TX (US)

(73) Assignee: ARM Limited, Cambridge (GB)

( * ) Notice: Subject to any disclaimer, the term of this patent is extended or adjusted under 35 U.S.C. 154(b) by 240 days.

(21) Appl. No.: 12/457,124

(22) Filed: Jun. 1, 2009

(65) Prior Publication Data

US 2010/0306505 A1     Dec. 2, 2010

(51) Int. Cl.
  *G06F 9/30* (2006.01)
  *G06F 9/40* (2006.01)
  *G06F 15/00* (2006.01)
(52) U.S. Cl. .................. 712/214; 712/215; 712/218
(58) Field of Classification Search .................. None
  See application file for complete search history.

(56) References Cited

U.S. PATENT DOCUMENTS

| | | | | |
|---|---|---|---|---|
| 6,112,019 A | * | 8/2000 | Chamdani et al. | 712/214 |
| 6,311,261 B1 | * | 10/2001 | Chamdani et al. | 712/23 |
| 2009/0198974 A1 | * | 8/2009 | Barowski et al. | 712/222 |

OTHER PUBLICATIONS

Smith et al.; Implementation of Precise Interrupts in Pipelined Processors; 1985; IEEE.*
Pleszkun et al.; The Performance of Multiple Functional Unit Processors; 1988; IEEE.*
Shen et al; Modern Processor Design; Beta Edition; 2003; McGraw-Hill.*

* cited by examiner

*Primary Examiner* — Corey S. Faherty
(74) *Attorney, Agent, or Firm* — Nixon & Vanderhye P.C.

(57) ABSTRACT

A processor 2 includes an execution cluster 10 having multiple execution units 14, 16, 18, 20. The execution units 14, 16, 18, 20 share result buses 22, 24. Issue circuitry 12 within the execution cluster 10 determines future availability of a result bus 22, 24 for an instruction to be issued (or recently issued) using a known cycle count for that instruction. The availability is tracked for each result bus using a mask register 32 storing a mask value within which each bit position indicates the availability or non-availability of that result bus at a particular processing cycle in the future. The mask value is left shifted each processing cycle.

15 Claims, 3 Drawing Sheets

RESULT PATH SHARING BETWEEN A PLURALITY OF EXECUTION UNITS WITHIN A PROCESSOR

BACKGROUND OF THE INVENTION

1. Field of the Invention

This invention relates to data processing systems. More particularly, this invention relates to data processing systems including a plurality of execution units for executing data processing operations to generate processing results to be carried by result paths within said processor.

2. Description of the Prior Art

It is known to provide data processing units incorporating multiple execution units. For example, a processor may include multiple execution clusters and each of these execution clusters, such as an ALU cluster, a load/store cluster and the like, may include multiple execution units capable of performing processing operations in parallel to generate processing results. The processing results which are generated need to be carried to other points within the processor. For example, the processing results may be needed by another execution unit in another execution cluster as a consequence of a dependency between a processing result generated by one execution unit and an input operand required by another execution unit.

It is known to provide processors in which each execution unit has its own result bus with which it can carry its processing results to other portions of the processor. However, this approach requires a large amount of circuit overhead associated with the result bus routing and selection mechanisms which must be provided for each of the result buses. Another approach is to share result buses between execution units and stall an execution unit when it has completed its execution if a result bus is not available to carry away the processing result. A disadvantage of this approach is that stalling execution units necessarily impacts processing performance as the execution unit is then not available to perform other processing operations until its stall condition is removed.

SUMMARY OF THE INVENTION

Viewed from one aspect the present invention provides an apparatus for processing data, said apparatus comprising:

a plurality of execution units responsive to program instructions to execute data processing operations to generate processing results;

at least one shared result path coupled to said plurality of execution units to carry said processing results generated by said plurality of execution units; and issue circuitry responsive to said program instructions to issue said data processing operations to said plurality of execution units for execution; wherein said issue circuitry controls execution of a given processing operation having a known processing time upon a given execution unit to generate a given processing result in dependence upon a determination using said known processing time of availability of said at least one shared result path to carry said given processing result when generated by said given execution unit.

The present technique recognizes that within a system having one or more shared result paths it is possible to gain more efficiency in the use of the execution units and the shared result paths by controlling execution of processing operations having a known processing time such that at the end of that known processing time a shared result path will be available to carry the processing result. The technique exploits the realization that the number of processing cycles a processing operation is to take is typically known in advance and accordingly it can be determined in which processing cycle that processing operation will generate its processing result. With this advance knowledge the execution of the processing operations can be scheduled such that a shared result path will be available when needed without the need to stall an execution unit.

It may be that execution is controlled by not issuing a processing operation to an execution unit until it is known that it can complete and generate its processing results with an available shared result path being available in the correct processing cycle. However, timing constraints associated with this determination may be eased if the processing operation is issued before such a determination is completed and if it is determined that a shared result path will not be available in the required processing cycle, then the processing operation can be cancelled. As the processing operation will typically not have progressed far along the pipeline of the execution unit concerned, little processing will be wasted and the execution unit will not be stalled as further processing operations can be fed into the execution unit.

In order to assist in determining the availability of the shared result path(s) at a future point in time the issue circuitry may track future use of the shared result path by already issued processing operations.

This tracking of future use may be facilitated by use of a mask register storing a mask value having bit positions representing availability of the shared result path in future processing cycles. In this case when a given processing operation is issued it may result in setting to a predetermined value (indicating that the shared result path will be used in that cycle) of a bit position within the mask value corresponding to a future processing cycle in which the given processing operation will generate its given processing result.

In this context, the mask value may be updated each processing cycle to correspond to how many processing cycles in the future those bit values represent. This updating can conveniently be in the form of a shift operation performed on the mask value.

The mask value may have a bit-length corresponding to a maximum number of processing cycles needed by any one of the plurality of execution units to generate its given processing result. This permits the mask value to track into the future by a sufficient amount to encompass a maximum processing delay associated with a processing operation and its use of the shared result path.

It will be appreciated that there may only be a single shared result path. However, in many embodiments it is appropriate to provide a plurality of shared result paths. The number of shared result paths provided will be less than the number of execution units as otherwise it would be worthwhile simply providing a dedicated result path for each execution unit.

As well as comparing the given processing operation with processing operations already "in-flight" within the plurality of execution units, the issue circuitry can also determine if another processing operation for issue in a common processing cycle conflicts for the use of the result path to carry their processing result and then selects between this another processing operation and the given processing operation for use of that shared result path.

The shared result path can take a variety of different forms. In one form the shared result path is a shared result bus which carries result data between execution units within an execution cluster and between execution clusters. In some embodiments a register store is provided and the plurality of execution units write respective processing results to the register store with a shared result path being coupled to at least one shared write port of the register store.

The present technique is particularly useful in out-of-order processors, although it does find utility outside of this field.

Viewed from another aspect the present invention provides an apparatus for processing data, said apparatus comprising:

a plurality of execution means responsive to program instructions for executing data processing operations to generate processing results;

at least one shared result path means coupled to said plurality of execution units for carrying said processing results generated by said plurality of execution means; and issue means responsive to said program instructions for issuing said data processing operations to said plurality of execution means for execution; wherein said issue means controls execution of a given processing operation having a known processing time upon a given execution means to generate a given processing result in dependence upon a determination using said known processing time of availability of said at least one shared result path means to carry said given processing result when generated by said given execution means.

Viewed from a further aspect the present invention provides a method of processing data, said method comprising the steps of:

in response to program instructions, using a plurality of execution units to execute data processing operations to generate processing results;

carrying said processing results generated by said plurality of execution units on at least one shared result path coupled to said plurality of execution units;

in response to said program instructions, issuing said data processing operations to said plurality of execution units for execution; and controlling execution of a given processing operation having a known processing time upon a given execution unit to generate a given processing result in dependence upon a determination using said known processing time of availability of said at least one shared result path to carry said given processing result when generated by said given execution unit.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
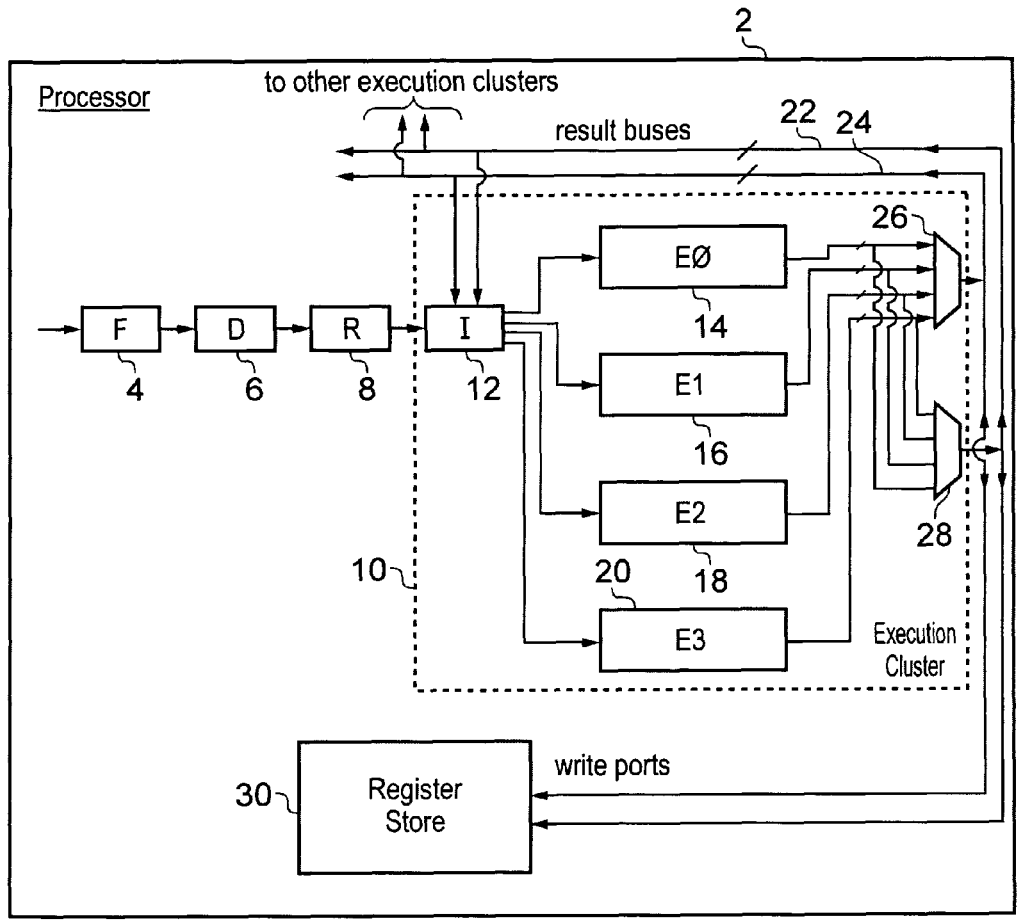
FIG. 1 schematically illustrates an out-of-order processor and in particular part of the instruction pipeline and one of the execution clusters within such a processor.

FIG. 1 shows an out-of-order processor 2 incorporating an instruction processing pipeline comprising a fetch stage 4, a decode stage 6, a rename stage 8 and a plurality of execution clusters 10. In FIG. 1 only one of the execution clusters is illustrated. The execution cluster 10 illustrated includes issue circuitry 12 for storing processing operations to be executed within that execution cluster 10 and issuing these to one of the execution units 14, 16, 18, 20. In this example there are four execution units 14, 16, 18, 20, but only two shared result buses 22, 24 are provided. Multiplexers 26, 28 select for each processing cycle which of the execution units 14, 16, 18, 20 is able to write out its processing result on to the associated result bus 22, 24. The result buses are coupled to the issue circuitry 12 where information such as which destination registers have now been written may be used to control the issue of further processing operations. The result buses are also coupled to other execution clusters (not illustrated) which similarly may use the result information in their determination of which processing operations to issue and to obtain the processing result data (e.g. destination register values written) from the result buses 22, 24. The result buses 22, 24 also are coupled to a register store 30, and in particular to write ports of the register store 30. Destination register values generated by the execution units 14, 16, 18, 20 may thus be written to the register store 30 via the result buses 22, 24.

As previously mentioned the issue circuitry 12 controls issue of processing operations into the execution units 14, 16, 18, 20 from an issue queue of processing operations dispatched to that execution cluster 10. The processor 2 is an out-of-order processing which issues processing operations from its issue queue to the appropriate execution unit 14, 16, 18, 20 when all of the issue conditions associated with that processing operation are met. In this example these issue conditions may be:

a) all sources are ready (or will be ready in the case of an accumulate register)
b) the required execution unit is available
c) another instruction to be issued into the execution unit concerned that is older in the program flow has not already been found
d) a shared result bus is available for use in the cycle that the processing operation will produce its result In order to ease timing constraints all of the above issue conditions may be checked in parallel and the instruction will be permitted to complete its execution if all the criteria are met. In practice the determination of the availability of the result bus may be slower than the other determinations. Accordingly, while the other determinations may gate issue, in this example described embodiment issue itself will take place before a determination of a result bus availability has been made and if the result bus will not be available when needed then the issued instruction will be cancelled.

The present technique is primarily concerned with the availability of a shared result bus 22, 24 when the processing result is generated. The other issue criteria will be familiar to those in this technical field and will not be described further herein.

Figure 2:
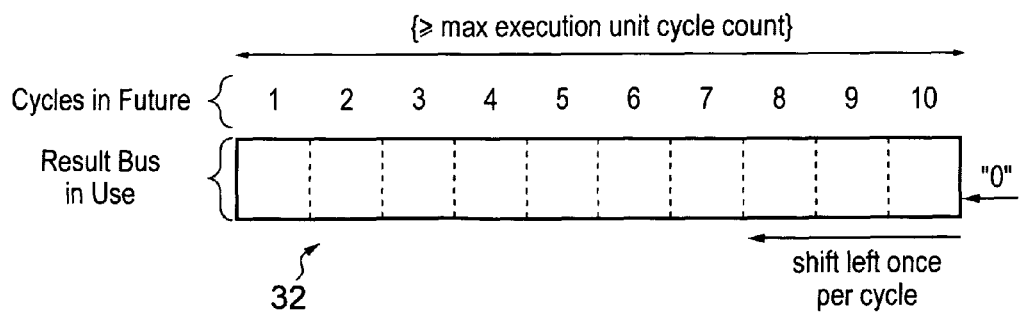
FIG. 2 schematically illustrates a mask register storing a mask value tracking future availability of a shared result path.

FIG. 2 illustrates a mask register 32 storing a 10-bit mask value in which each bit position stores a bit value indicating the availability or the non-availability of the result bus 22, 24 associated with that masked value at up to ten processing cycles in the future. The length of the mask value is selected in dependence upon the maximum processing cycle latency through any of the execution units 14, 16, 18, 20 such that future availability and non-availability of the result bus 22, 24 may be tracked into the future up to the maximum necessary time into the future. In this example, if a bit position within the mask value is set to a value of "1" then this indicates that the result bus 22, 24 is already being used to carry a processing result in that processing cycle in the future by a processing operation that is "in-flight" within the execution cluster 10. A bit value of "0" indicates that the result bus 22, 24 is available in the processing cycle concerned.

At each processing cycle the mask value is left shifted by one bit position so as to update the mask value to take account of the change of processing cycle. The bit position corresponding to ten processing cycles into the future is supplied with a starting bit value of "0" indicating its availability when the left shift occurs.

Figure 3:
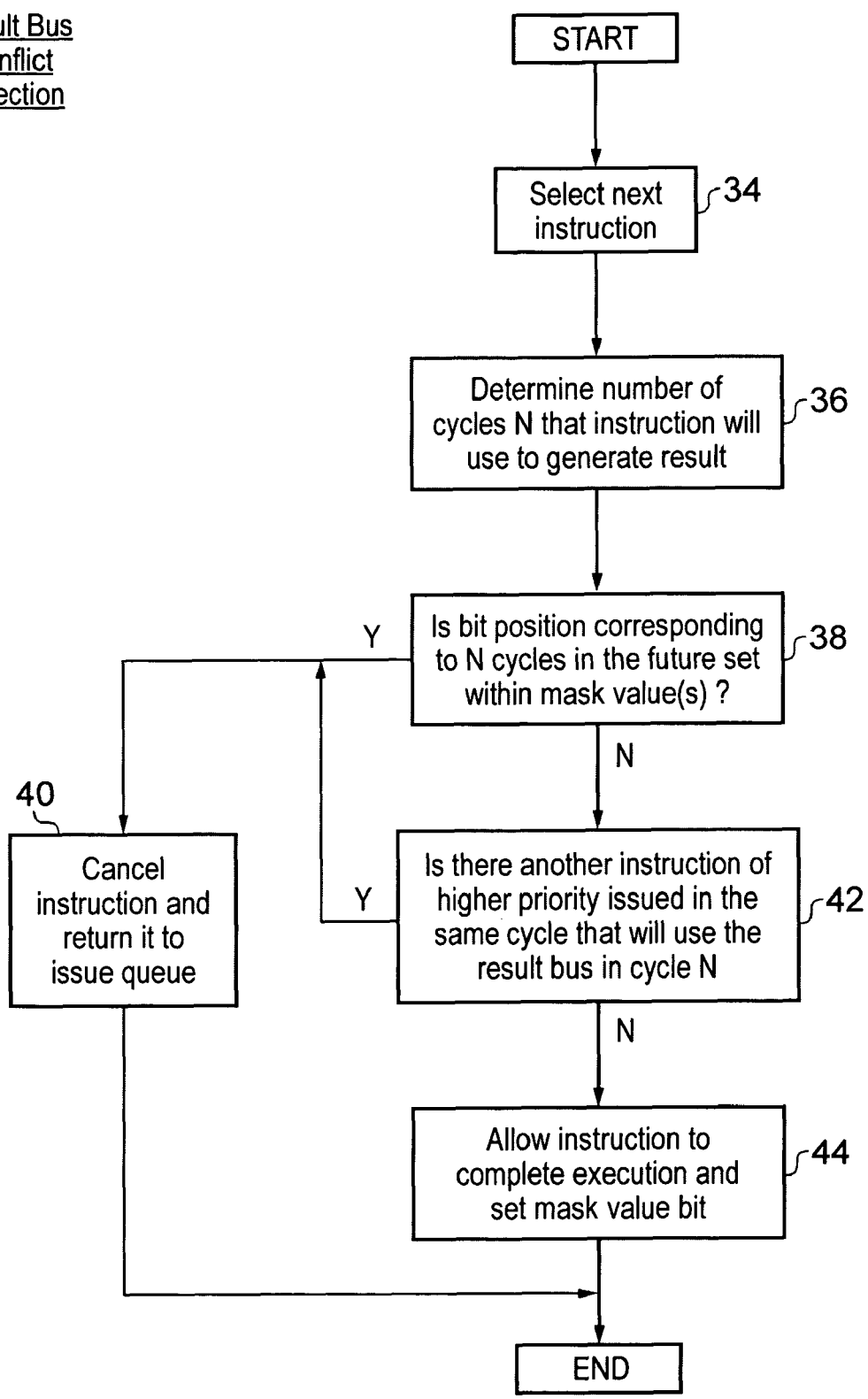
FIG. 3 is a flow diagram schematically illustrating how issue circuitry may perform result bus conflict detection.

FIG. 3 is a flow diagram schematically illustrating a process of result bus conflict detection which may be performed by the issue circuitry 12. It will be appreciated that the issue circuitry 12 performs many other processing operations, such as determining the status of the other issue conditions previously discussed. The flow diagram of FIG. 3 illustrates the conflict detection as a sequential process but it will be appreciated by those in this technical field that such processes may be re-ordered and/or performed wholly or partially in parallel in some implementations.

At step 34 a next instruction to be issued from the issue queue is selected for result bus conflict detection. Step 36 determines from the type of instruction concerned how many processing cycles will be needed for that instruction to generate its result. It will be appreciated by those in this technical field that different instructions have different known cycle counts. Thus, a simple logic operation may take one processing cycle to execute. Conversely, a complicated multiply and/or add operation may take more cycles, such as up to ten cycles, to complete. In either case, using an at least partial decoding of the opcode of the instruction concerned a determination can be made of the number of cycles N that the instruction concerned will take to execute.

At step 38 the mask value within the mask register 32 is examined and the bit position corresponding to N cycles in the future is checked to see if the result bus 22, 24 whose availability is indicated by that mask value will be available for use by the candidate instruction in the processing cycle N cycles in the future.

If the determination at step 38 is that the bit position within the mask value indicates that the result bus 22, 24 will not be available (i.e. the bit value is set), then processing proceeds to step 40 where the instruction, which has already been issued, is cancelled and returned to the issue queue such that it can be reissued (replayed) at a later time.

If the determination at step 38 is that the mask value does not indicate a result bus conflict at cycle N in the future, then processing proceeds to step 42 at which a determination is made as to whether or not there is another instruction of a higher "priority" that was issued in the same cycle and that will use the result bus N cycles in the future. If there is no conflicting instruction issued in the same cycle of a higher priority, then the instruction concerned will be determined as allowed to complete its execution at step 44 and the bit value corresponding to N cycles in the future within the mask value is set. If the determination at step 42 was that there was a conflicting instruction issued in the same cycle, then processing will again proceed to step 40.

It will be appreciated that when there are multiple shared result buses 22, 24 available, the check for an available result bus N cycles in the future may be made against each of the mask values for the respective result buses 22, 24. If any of these is available, then the instruction may be allowed to complete its execution and the appropriate bit within the result bus 22, 24 selected for use should be set.

In determining which of multiple instructions issued in the same cycle should be considered as having a higher priority when they conflict for use of a result bus, it is possible that priority may be determined in a variety of different ways. One useful way of determining priority is that the older instruction should be treated as having a higher priority as it is more likely that there will be other instructions or portions of the processor 2 that may be waiting for the processing results of that older instruction. Another form of priority indication is whether the instruction generates multiple results, e.g. has multiple destination registers and will require the use of multiple result buses 22, 24. It is easy to starve such instructions requiring multiple result buses 22, 24 of access to the result buses 22, 24 as they require a cycle to be available simultaneously on both buses and consequently such instructions may be given priority over instructions only requiring a single result bus 22, 24.

Figure 4:
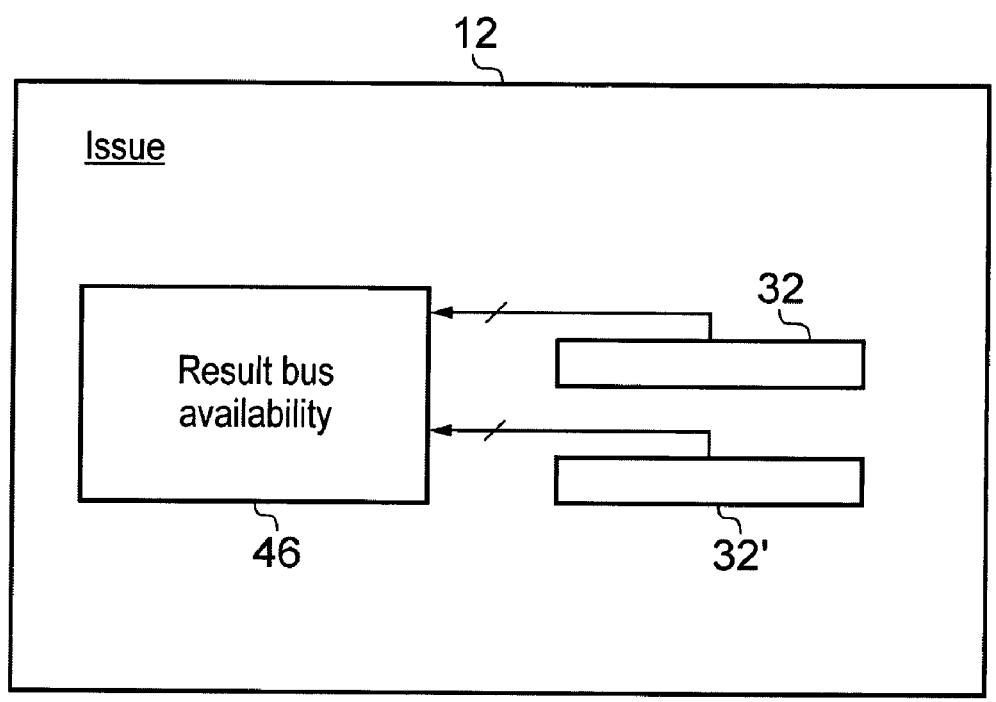
FIG. 4 is a diagram schematically illustrating issue circuitry and a portion thereof which performs result bus conflict detection.

FIG. 4 schematically illustrates the issue circuitry including two mask registers 32, 32' coupled to result bus availability determination circuitry 46. This logic 46 may embody the processing illustrated in FIG. 3 in a hardware form. More particularly, FIG. 4 illustrates how the two mask registers 32, 32' are used as an input to result bus availability determination circuitry 46 for use in the decision regarding result bus availability (see step 38 in FIG. 3).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a plurality of execution units responsive to program instructions to execute data processing operations to generate processing results;
    at least one shared result path coupled to said plurality of execution units to carry said processing results generated by said plurality of execution units; and
    issue circuitry responsive to said program instructions to issue said data processing operations to said plurality of execution units for execution; wherein
    said issue circuitry controls execution of a given processing operation having a known processing time upon a given execution unit to generate a given processing result in dependence upon a determination using said known processing time and availability of said at least one shared result path to carry said given processing result when generated by said given execution unit, wherein said issue circuitry is responsive to a number of processing cycles that will be required to execute said given processing operation to determine a processing cycle in which said given processing result will be generated if issued and completely executed and at least does not permit complete execution of said given processing operation to generate said given processing result unless said at least one shared result path will be available to carry said given processing result when generated, wherein said given processing operation is issued independently of availability of said at least one shared result path but execution of said given processing operation is cancelled if said issue circuitry determines that said at least one shared result path will be unavailable when said given processing result will be generated.

2. Apparatus as claimed in claim 1, wherein said issue circuitry controls issue for execution of said given processing operation in dependence upon said availability.

3. Apparatus as claimed in claim 1, wherein said issue circuitry tracks future use of said at least one shared result path by already issued processing operations.

4. Apparatus as claimed in claim 3, wherein for each of said at least one result path, said issue circuitry includes a mask register storing a mask value having bit positions representing availability of said at least one shared result path in future processing cycles.

5. Apparatus as claimed in claim 4, wherein when said issue circuitry issues said given processing operation it sets to a predetermined value of a bit position within said mask value corresponding to a future processing cycle in which said given processing operation will generate said given processing result.

6. Apparatus as claimed in claim 5, wherein said mask value is shifted each processing cycle to update bit values of said mask value to positions corresponding to how many processing cycles in the future those bit values represent.

7. Apparatus as claimed in claim 4, wherein said mask value has a bit-length corresponding to a maximum number of processing cycles needed by any one of said plurality of execution units to generate said given processing result.

8. Apparatus as claimed in claim 1, comprising a plurality of shared result paths and wherein there are fewer shared result paths than execution units.

9. Apparatus as claimed in claim 8, wherein said issue circuitry determines availability of a shared result path from any of said plurality of shared result paths.

10. Apparatus as claimed in claim 1, wherein said issue circuitry determines if another processing operation for issue in a common processing cycle conflicts for use of said at least one result path to carry their processing result and selects one of said given processing operation and said another processing operation for issue if said at least one shared result path is available.

11. Apparatus as claimed in claim 1, wherein said at least one shared result path is a shared result bus within a processor.

12. Apparatus as claimed in claim 11, wherein said processor is an out-of-order processor.

13. Apparatus as claimed in claim 1, comprising a register store, said plurality of execution units writing respective processing results to said register store, said at least one shared result path being coupled to at least one shared write port of said register store.

14. Apparatus for processing data, said apparatus comprising:
a plurality of execution means responsive to program instructions for executing data processing operations, for generating processing results;
at least one shared result path means, coupled to said plurality of execution units for carrying said processing results generated by said plurality of execution means; and
issue means, responsive to said program instructions for issuing said data processing operations to said plurality of execution means for execution; wherein
said issue means controls execution of a given processing operation having a known processing time upon a given execution means to generate a given processing result in dependence upon a determination using said known processing time and availability of said at least one shared result path means to carry said given processing result when generated by said given execution means, wherein said issue means is responsive to a number of processing cycles that will be required to execute said given processing operation to determine a processing cycle in which said given processing result will be generated if issued and completely executed and at least does not permit complete execution of said given processing operation to generate said given processing result unless said at least one shared result path means will be available to carry said given processing result when generated, and said given processing operation is issued independently of availability of said at least one shared result path means but execution of said given processing operation is cancelled if said issue means determines that said at least one shared result path means will be unavailable when said given processing result will be generated.

15. A method of processing data, said method comprising the steps of:
using, in response to program instructions, a plurality of execution units to execute data processing operations to generate processing results;
carrying said processing results generated by said plurality of execution units on at least one shared result path coupled to said plurality of execution units;
issuing, in response to said program instructions, said data processing operations to said plurality of execution units for execution;
controlling execution of a given processing operation having a known processing time upon a given execution unit to generate a given processing result in dependence upon a determination using said known processing time and availability of said at least one shared result path to carry said given processing result when generated by said given execution unit; and
determining, in response to a number of processing cycles that will be required to execute said given processing operation, a processing cycle in which said given processing result will be generated if issued and completely executed and at least not permitting complete execution of said given processing operation to generate said given processing result unless said at least one shared result path will be available to carry said given processing result when generated, wherein said issuing step issues said given processing operation independently of availability of said at least one shared result path but execution of said given processing operation is cancelled if said determining step determines that said at least one shared result path will be unavailable when said given processing result will be generated.

* * * * *